(12) United States Patent
Evans et al.

(10) Patent No.: US 7,679,255 B2
(45) Date of Patent: Mar. 16, 2010

(54) ELECTRICAL MACHINE

(75) Inventors: Steven-Andrew Evans, Buehl (DE); Barrie C. Mecrow, Whitley Bay (GB); Alan G. Jack, Hexham (GB)

(73) Assignee: Robert Bosch GmbH, Stuttgart (DE)

( * ) Notice: Subject to any disclaimer, the term of this patent is extended or adjusted under 35 U.S.C. 154(b) by 723 days.

(21) Appl. No.: 10/555,112

(22) PCT Filed: Feb. 20, 2004

(86) PCT No.: PCT/DE2004/000317
§ 371 (c)(1), (2), (4) Date: Jan. 23, 2007

(87) PCT Pub. No.: WO2004/098023
PCT Pub. Date: Nov. 11, 2004

(65) Prior Publication Data
US 2007/0138876 A1    Jun. 21, 2007

(30) Foreign Application Priority Data
Apr. 29, 2003    (DE) .............................. 103 19 190

(51) Int. Cl.
*H02K 1/00* (2006.01)
(52) U.S. Cl. ...................................... 310/216; 310/254
(58) Field of Classification Search ................. 310/216, 310/217, 218, 254
See application file for complete search history.

(56) References Cited
U.S. PATENT DOCUMENTS
6,087,755 A    7/2000    Matsushita et al.
6,140,726 A    10/2000    Kagawa et al.
6,188,159 B1    2/2001    Fan
6,946,771 B2 *    9/2005    Cros et al. ................... 310/257
7,005,764 B2 *    2/2006    Petersen ...................... 310/44
2004/0113511 A1 *    6/2004    Schmidt et al. ............. 310/218

FOREIGN PATENT DOCUMENTS

| FR | 1 175 122 | 3/1959 |
| JP | 1-175353 | 7/1989 |
| JP | 6-275165 | 9/1994 |
| JP | 2001-016806 | 1/2001 |
| JP | 2002-512499 | 4/2002 |
| JP | 2002-359938 | 12/2002 |
| WO | 99 50949 | 10/1999 |
| WO | WO 99/54985 | 10/1999 |
| WO | 00 69047 | 11/2000 |
| WO | WO 02/058210 | * 7/2002 |

\* cited by examiner

*Primary Examiner*—Nguyen N Hanh
(74) *Attorney, Agent, or Firm*—Kenyon & Kenyon LLP

(57) ABSTRACT

An electrical machine is described, having a stationary main element as stator and a rotating main element as rotor, of which one main element having a magnetic yoke and poles, of a predefined number of poles, projecting radially from the former, is made of SMC material and carries a pole winding on each pole. To achieve cost-effective manufacturing of the main element, the main element is assembled from at least two modules that are axially adjacent, rigidly connected to one another, and produced from SMC material, each module having a yoke part, closed in on itself, of the magnetic yoke having an equal number of divisions of poles attached thereto in one piece, which corresponds to a fraction of the number of poles determined by the number of modules.

16 Claims, 7 Drawing Sheets

ELECTRICAL MACHINE

FIELD OF THE INVENTION

The present invention relates to an electrical machine having a stationary main element as stator and a rotating main element as rotor, of which one is produced from SMC material.

BACKGROUND INFORMATION

Magnetic conductive members of stators or rotors of electrical machines will, in the near future, be increasingly made of SMC material (soft magnetic powder iron composite), and will replace laminated core assemblies or laminated cores, since, from a manufacturing technology point of view, they are much more simple to produce. The SMC material is pressed into the desired shape using a pressing mold, and is then heat treated at a relatively low temperature, so that the necessary insulating layers between the powder particles are not destroyed.

In one known multipolar stator made of SMC material for an internal-rotor machine (PCT International Publication No. 99/50949) the outer-lying magnetic yoke is composed of a number of yoke segments corresponding to the number of poles of the stator poles. Each yoke segment carries in one piece a stator pole having a pole core and a pole shoe bordering the pole core at the latter's remote end. Each yoke segment along with pole core and pole shoe is produced from SMC material by pressing and heat treating. The pole cores are rounded off at their axial ends or have an oval profile, so that, as a result of the removal of sharp edges at the pole cores, only a thin insulating layer has to be applied, onto which the pole winding may then be wound. The individual pole windings of the stator winding are wound directly onto the pole cores, using the usual machine-based winding technology. After winding the pole windings, the individual yoke segments are set next to one another in the circumferential direction and are fixedly connected to one another.

In the case of another known stator made of an SMC material for an internal-rotor motor (PCT International Publication No. 00/69047), the ring-shaped magnetic yoke on the one hand, and the stator pole having pole core and pole shoe on the other hand, are made separately of SMC material in the desired shape. After sliding the pole windings, prefabricated as ring coils, onto the pole cores, the stator poles are set into prepared recesses in the magnetic yoke with form locking, with the ends of the pole cores that are at a distance from the pole shoe, and are fastened there.

SUMMARY OF THE INVENTION

The electrical machines according to the present invention have the advantage that the main element of the electrical machine, made of SMC material, e.g. the rotor of a commutator motor or the stator of a brushless DC motor or synchronous motor, an asynchronous motor, a switched reluctance motor or a synchronous reluctance motor is composed only of extremely few modules which, from a manufacturing technology point of view, may favorably be pressed from SMC material. The modules are preferably pressed from an SMC powder having a density of 7.3 g/cm$^3$ or greater, in order to achieve the required magnetic properties, and are subsequently exposed for about 30 minutes to a temperature of ca. 500° C., in order also to be given acceptable mechanical properties. In this context, the main element may be executed having all the usual number of poles.

In contrast to the composition undertaken in the circumferential direction, of the yoke segments pressed from SMC material in the related art, axially assembling only two or three modules is non-problematical from a manufacturing technology point of view, since, in contrast to what is done in the related art, no centrifugal forces act on the connecting locations between the assembled parts. Fixing the modules to one another may, for example, be undertaken by simple adhesion or mechanical clamping. The subdivision of the main element into two or three or more modules, each having only one part of the overall number of poles, makes possible the winding of the individual poles using the pole windings developed as individual coils in the usual winding technique on customary winding machines, since the pole gaps in the poles in each module are sufficiently large for guiding through the winding finger that guides the winding wire, because of the absence of the poles assigned in each case to the other modules. Because of the low number of modules for forming the main element, which may partially even be executed identically, both manufacturing costs for the modules themselves and assembly costs for the main element are clearly reduced, so that the main element may be manufactured in a clearly more cost-effective manner as compared to known rotors or stators made of SMC material. The main element made of SMC material is implemented equally well for internal-rotor and external rotor machines.

According to one advantageous specific embodiment, the poles at each yoke part are situated offset by equal circumferential angles to one another, the yoke parts preferably having equal axial widths, and at least two of the modules being designed identically. Because of these measures, the piece number of the modules that may be manufactured using one pressing mold may be doubled, which reduces the production costs. In each case, two modules having axes rotated by 180° to each other are assembled for the main element. For motors of greater power, which require a main element having greater axial dimension, the main element is composed of several, such as three modules. Because of that, the yoke parts of the individual modules have a small axial width or depth, which is advantageous for the pressing procedure. Because of the poles subdivided into several modules, bigger pole gaps are created in the individual modules, which brings along advantages in the mechanical winding of the poles.

According to one advantageous specific embodiment of the present invention, each pole has a pole core and a pole shoe that is situated at the former's end that is distant from the yoke part, and is thus in one piece. The pole cores have an axial core width corresponding to the axial width of the yoke part, and the pole shoes are designed in such a way that their boundary edges that extend in the circumferential direction are in alignment with one another when the modules are put together. Using this manner of construction, one may advantageously implement an external-rotor motor, and preferably, indeed, using only two modules. In this context, the pole shoes are aligned in the axial direction asymmetrically to the pole cores, so that on one side they axially protrude beyond the yoke part, and, when the modules are put together, their protruding region is inserted into the other modules.

According to one advantageous specific embodiment of the present invention, each pole has a pole core and a pole shoe that is situated at the former's end that is distant from the yoke part, and is thus in one piece with it. The axial width of the pole core is greater than the axial width of the yoke part, and the yoke parts have notches on their end face facing the other module respectively, for the form locking partial accommodation of the pole cores in the region where they protrude beyond the yoke part of the adjoining module. The pole shoes, again, are aligned to the pole cores in such a way that their matching edges extending in the circumferential direction are in alignment. Because of this method of construction, a stator of an external-rotor machine or a rotor of an internal-rotor machine may be implemented using three modules whose yoke parts have a clearly smaller axial width. The cross section of the pole cores and the surfaces of the pole shoes, and thus the magnetic relationships remain unchanged from the two-module embodiment. The pole shoes of the two outer modules, as seen in the axial direction, are again aligned asymmetrically to the pole shoes, while the pole shoes of the middle module is situated symmetrically to the pole cores. The protruding regions of the pole shoes beyond the yoke parts, in the case of assembled modules, are then inserted in each case into the adjacent module.

According to one advantageous specific embodiment of the present invention, in each module the poles extend beyond at least one end face of the yoke part in the axial direction so far that, with the modules assembled, the poles extend over the axial width of the magnetic yoke, preferably their axial lengths being equal to the axial length of the permanent magnet segments, for reasons of stray field reduction.

In the case of a main element assembled from two modules, in this context, the poles extend beyond the yoke part on one side, and are inserted, using their protruding region, into the yoke part of the other module. In a three-module composition of the main element, as in the case of the two-module embodiment, the poles of the two outer modules extend beyond the respective yoke part on one side, while, in the case of the middle module, the poles symmetrically protrude on both sides of the yoke part. Because of this method of construction, preferably the stator of an internal-rotor motor may manifest itself advantageously. The poles may be executed with or without pole shoes, additional mechanical means having to be provided for holding the pole winding on the pole cores, in the case of lacking pole shoes, thus, for example, according to one advantageous specific embodiment of the present invention, a concave arching at least one axial end face of the pole cores, into which, then, a pole winding prefabricated as a ring coil is inserted and swiveled onto the pole core, and in this context, becomes axially clamped. In the case where pole cores are closed off using pole shoes which protrude on the edge beyond the pole cores, these additional holding means are omitted, and the pole winding is wound directly onto the pole cores. The usual winding techniques may be used for this, since the distance between the poles in each module is large enough to make possible guiding through the winding FINGER that guides the winding wire.

DETAILED DESCRIPTION

Figure 1:
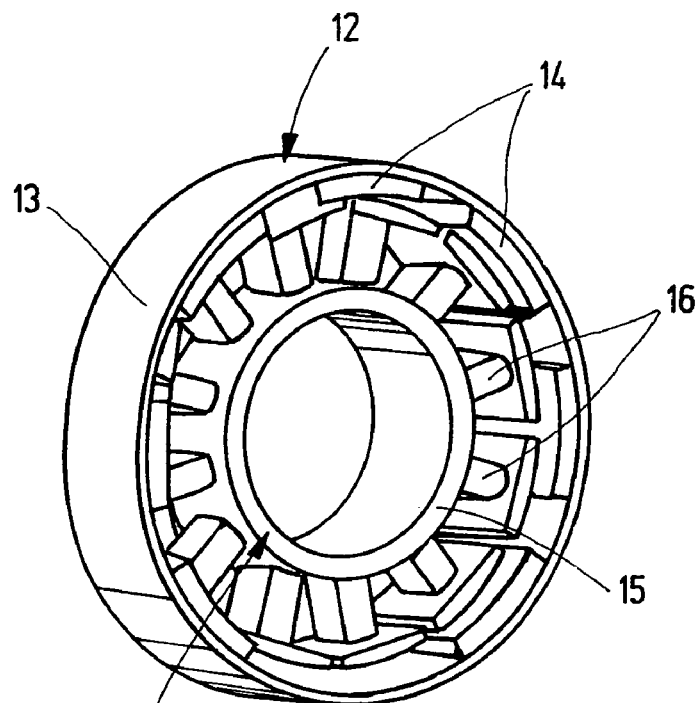
FIG. 1 shows a perspective view of an external-rotor motor.
Figure 2:
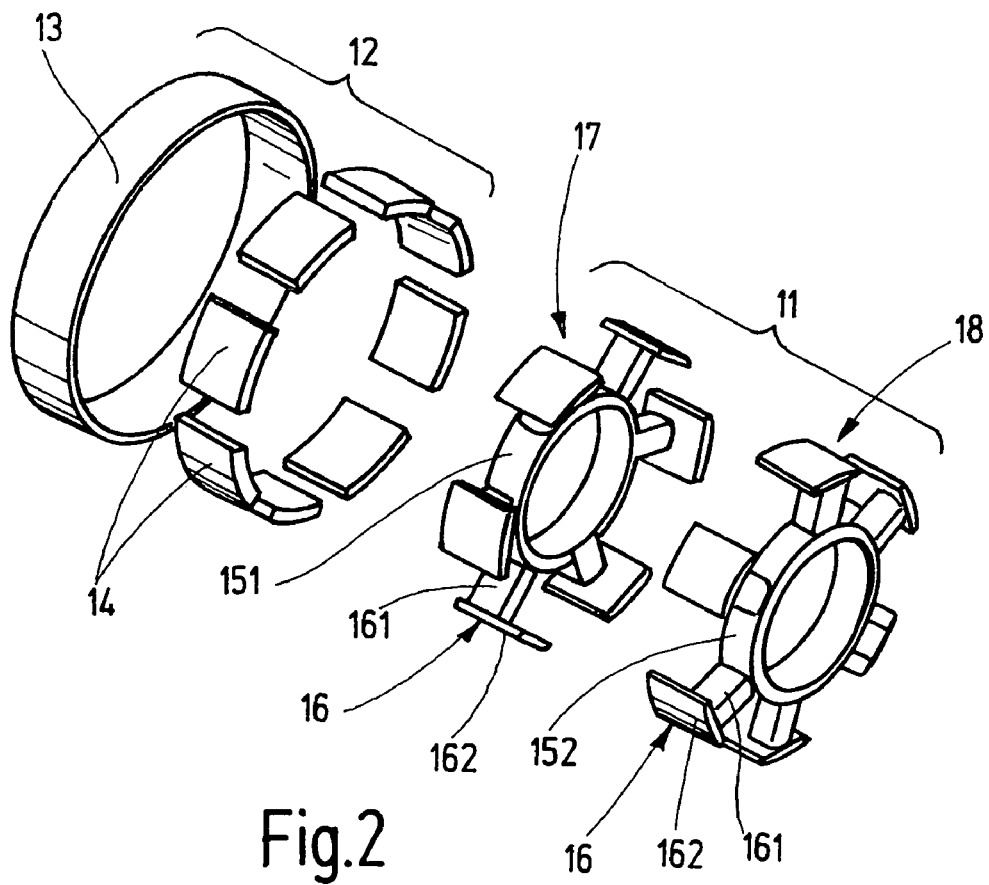
FIG. 2 shows an exploded view of the external-rotor motor in FIG. 1.

FIGS. 1 and 2 show a brushless, eight pole external-rotor DC motor having a stator 11 and a rotor 12 that concentrically surrounds stator 11 in a perspective or an exploded representation. Stator 11 and rotor 12 represent the so-called main elements of the motor. Rotor 12 has the usual construction and has a solid or laminated outer ring 13, that bears eight permanent magnet segments 14 on its inner surface facing stator 11, which are situated offset by equal circumferential angles, and are polarized alternately in opposite direction. Stator 11 has a ring-shaped magnetic yoke 15 and twelve teeth or poles 16 in total, which project radially outwards from magnetic yoke 15, and are situated offset by equal circumferential angles with respect to one another at magnetic yoke 15, and in one piece with it.

Each pole 16 has a pole core 161 and a pole shoe 162, which is situated in one piece with pole core 161 at the end of pole core 161 facing away from the yoke. Pole shoes 162 have an axial length corresponding to the axial width of permanent magnet segments 14, and protrude on all sides beyond pole cores 161, which, on the one hand, has the effect of a flux concentration in pole cores 161, and, on the other hand, is used for supporting a pole winding wound on pole core 161. All poles 16 are covered by a pole winding not shown in FIGS. 1 and 2, which is designed as a concentrated ring coil.

As may be seen in the exploded representation of the motor in FIG. 2, stator 11 is composed of two axially adjoining modules 17, 18 that are rigidly connected to each other. Each module 17, 18 has a ring-shaped yoke part 151, 152, closed on itself, of magnetic yoke 15, having in each case six of the in total twelve poles 16. Corresponding to the division of poles 16 into the two yoke parts 151, 152, at each yoke part 151 or 152, poles 16, in turn, are offset by equal circumferential angles to one another, the angle of staggering being twice as great as the angle of staggering between poles 16 in stator 11 in FIG. 1. Pole shoes 162 of poles 16 are aligned asymmetrically to pole cores 161, and axially protrude beyond the one end face of yoke part 151 or 152. Modules 17, 18 are made of SMC material (soft magnetic powder iron composite), SMC iron powder being pressed in a press form into the shape of modules 17, 18 that are to be seen in FIG. 2, and is subsequently exposed for 30 min to a temperature of ca. 500° C.

Since the two modules 17, 18 have identical shapes, they may be produced using the same mold, so that there results a large quantity of modules 17, 18 that is favorable for manufacturing. Now, a pole winding is wound on all poles 16, because of doubly enlarged distance between adjacent poles 16, the usual winding techniques on the usual winding machines may be used without a problem Modules 17, 18, thus wound, are axially assembled using module axes that are rotated by 180° with respect to each other, namely, in such a way that pole shoes 162 penetrate at poles 16 of the one module 17 into the gaps present between pole shoes 162 of the other module 18, and vice versa. In this context, because of the development of pole shoes 162 already mentioned, the bordering edges of pole shoes 162 that extend in the circumferential direction are aligned. The two modules 17, 18 are rigidly connected to each other, e.g. by adhesion or clamping the adjoining, ring-shaped end faces of yoke parts 151, 152.

Figure 3:
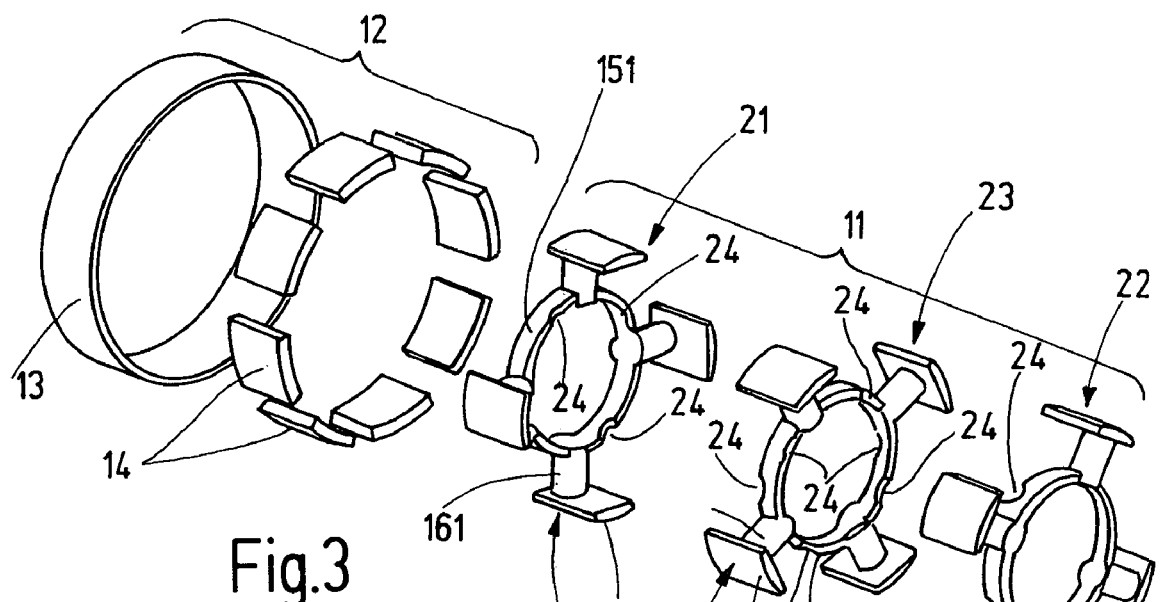
FIG. 3 shows an exploded view of an external-rotor motor according to a further exemplary embodiment.

In the exemplary embodiment, that may be seen in exploded representation in FIG. 3, of a likewise brushless, eight pole external-rotor DC motor, as may be seen assembled in FIG. 1, stator 11 is assembled from three modules 21, 22 and 23. Each module 21-23 has, in turn, a yoke part 151-153, whose axial width amounts to one-third of the axial width of magnetic yoke 15. Each module 21-23 at this point has only four poles 16 having in each case a pole core 161 and a pole shoe 162, which are situated offset by 90° in the circumferential direction with respect to one another at magnetic yoke 15. The number of poles 16 at each module 21-23 is equal to a third of the total number of stator poles 16. The axial width of pole cores 161 is maintained corresponding to poles 16 in FIG. 2, so that, at this point, pole cores 161 project axially over yoke parts 151-153. In the two outer modules 21 and 22 in FIG. 3, pole cores 161 protrude on one side beyond yoke parts 151, 152 in the axial direction, whereas in middle module 23, pole cores 161 extend on both parts axially slightly beyond yoke part 153. Pole shoes 162 in the two outer modules 21, 22, are, in turn, aligned asymmetrically to pole cores 161 in the axial direction. In middle module 23, pole shoes 162 are aligned symmetrically to pole cores 161. Yoke parts 151, 152 of the two outer modules 21, 22 have, in their one ring-shaped end face, four concave notches 24, which are used for the form locking accommodation of protruding regions of pole cores 161 of middle module 23. Middle module 23 has respectively four concave notches 24 in both end faces of yoke part 153. Notches 24 are used for the form locking accommodation of pole cores 161 that protrude beyond yoke parts 151, 152 of the two outer modules 21, 22. The pole windings again are applied by direct winding of pole cores 161 to poles 16 of the three modules 21-23. All three modules 21, 22, 23 are, in turn, made of SMC material using the method described, the two outer modules 21, 22 being identical and being produced using the same mold. A separate mold is required for middle module 23. The three wound modules 21, 22, 23 are axially assembled is the alignment shown in FIG. 3, and are rigidly connected to one another. In the composite form, the bordering edges of pole shoes 162, that extend in the circumferential direction, are in alignment.

Stator 11 shown in FIGS. 2 and 3 may also be developed having a different number of poles. In this context, basically stators having three, nine or fifteen poles are assembled from three modules, of which two are identical, and stators having six, twelve or eighteen poles are assembled from only two identical modules. A similar division is also possible in the case of an even higher number of poles.

Figure 4:
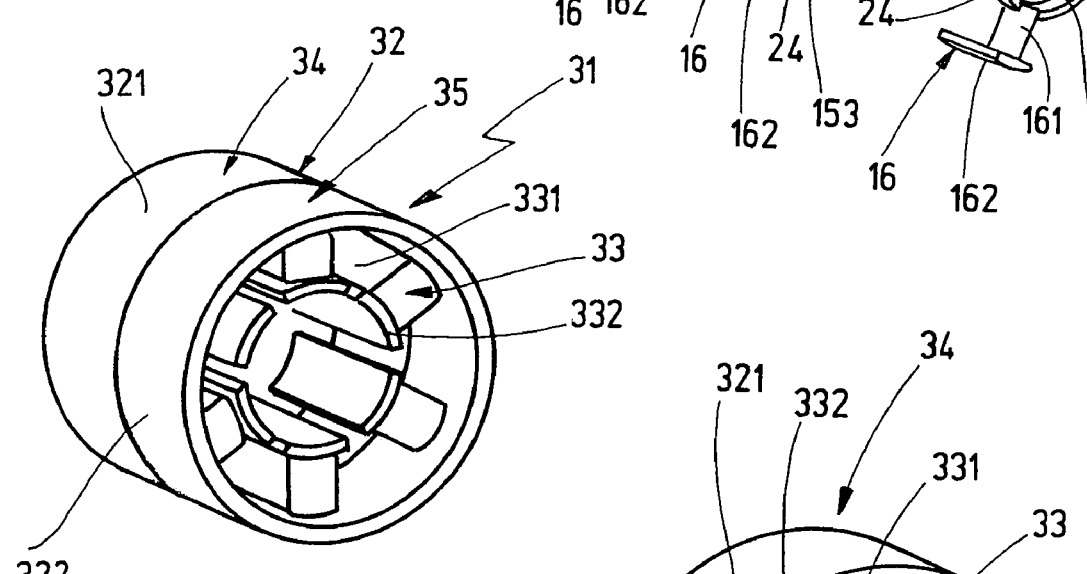
FIG. 4 shows a perspective view of a stator of an internal-rotor motor.

FIG. 4 shows a stator for a three-phase, four pole internal-rotor DC motor. This stator 31 has a cylindrical or ring-shaped magnetic yoke 32, and six poles 33 radially protruding inwards from it and in one piece with it. Each pole 33 has a pole core 331 and a pole shoe 332 situated at the end of pole core 331, that is distant from the yoke, and in one piece with the former, and which protrudes somewhat on all sides beyond pole core 331. A pole winding that is not shown here is accommodated, in turn, on each pole core 331, as may be seen, for example in FIGS. 15 and 16.

Stator 31, in turn, is composed of two axially adjoining modules 34, 35, that are rigidly connected to each other. Each module 34 and 35 has a yoke part 321 and 322, respectively, of magnetic yoke 32 that is closed in on itself, whose axial width is half as great as that of magnetic yoke 32. A half the poles 33 of stator 31 is situated at each yoke part 321, 322, which, again, are situated offset by equal circumferential angles to one another.

Figure 5:
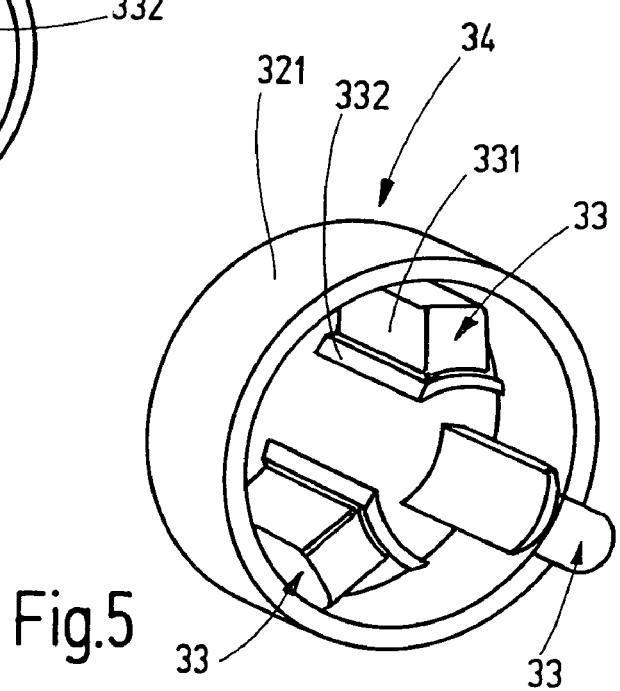
FIG. 5 shows a representation in perspective of a module of the stator in FIG. 4.

FIG. 5 shows in perspective the one module 34 of stator 31, with its yoke part 321 and its three poles 33 that are situated offset by 120° with respect to one another. The other module 35 is developed identically. Both modules 34, 35 are produced from SMC material in the same mold. As may be seen in FIG. 5, in each module 34, 35, poles 33 axially project so far beyond an end face of yoke part 321 and 322 that, in assembled modules 34, 35, they extend over the axial width of magnetic yoke 32. Since the axial length of magnetic yoke 32 is selected to be somewhat greater than the axial length of poles 33, the axial ends of poles 33 are somewhat set back compared to the outer edges of magnetic yoke 32. The axial length of pole shoes 332 would, in turn, correspond to the axial length of the permanent magnet segments of a rotor. After winding poles 33 using the individual pole windings, the two modules 34, 35 are axially assembled using module axes rotated by 180° with respect to each other, poles 33 penetrating the pole gaps of the respective other module 35, 34 using their region that protrudes on one side beyond yoke parts 321, 322. The adjoining, ring-shaped end faces of yoke parts 321, 322 are adhered together or are rigidly connected to each other in another way.

Figure 17:
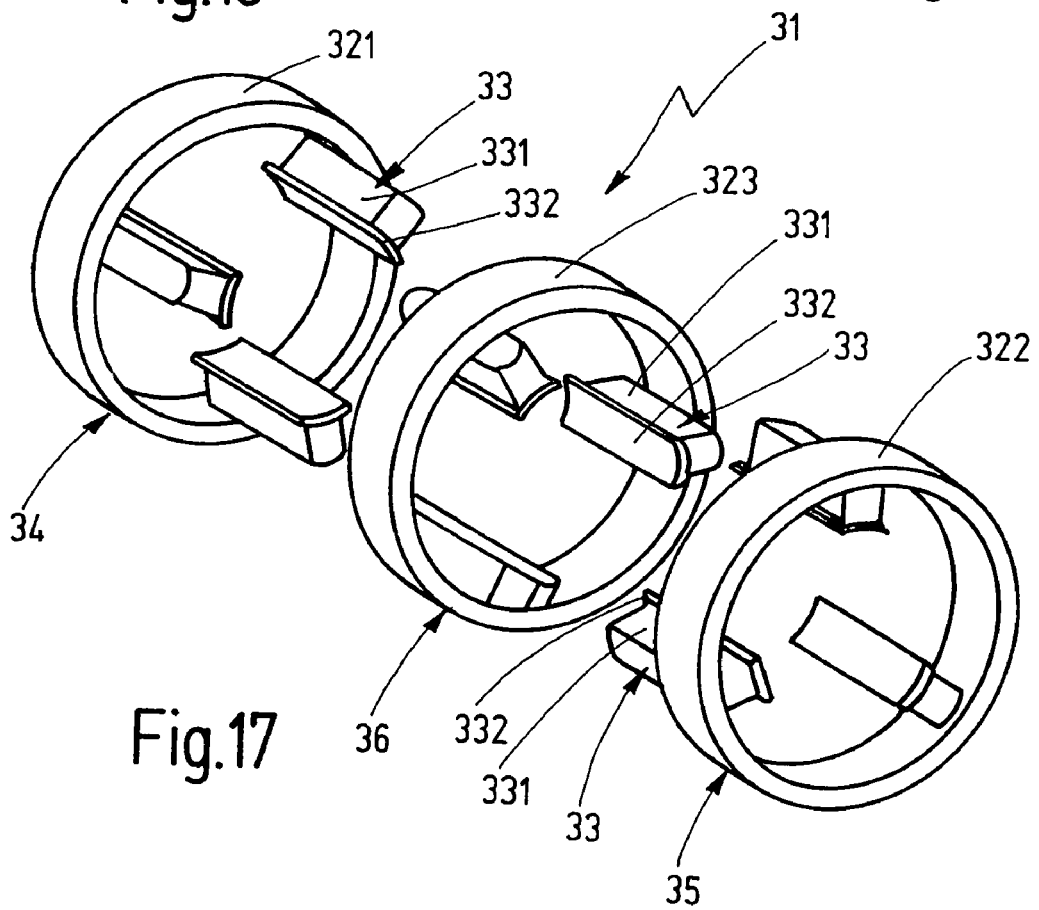
FIG. 17 shows an exploded representation of a stator for an internal-rotor motor according to a seventh exemplary embodiment.

Stator 31 shown in exploded representation in FIG. 17 for an internal-rotor motor differs from the motor described for FIGS. 4 and 5 in that it carries in total nine poles 33 on magnetic yoke 32, and is composed of in total three modules 34-36, of which the two outer modules 34, 35 are developed identically and correspond in their design to module 34 described in FIG. 5. Middle module 36 has a yoke part 323 which has the same axial width as yoke parts 321, 322 of the two outer modules 34, 35. On yoke part 323, same as on the two outer modules 34, 35, there are three poles 33 that are situated, offset by 120° in the circumferential direction, that are developed as one piece with yoke part 323. Poles 33, whose axial length is slightly shorter than the sum of the axial widths of yoke parts 321-323 of modules 34-36, protrude on both sides beyond yoke part 323, and, in fact, symmetrically. Middle module 36 is also made of SMC material, a separate mold being required, however, in this instance. Modules 34-36, that are provided with pole windings, are axially assembled in the alignment shown in FIG. 17, and yoke parts 321-323 are rigidly connected to one another, such as by adhesion or clamping.

What was said about stators 11 according to FIGS. 2 and 3 also applies to stators 31 in FIG. 4 and 17, namely, that they are able to be designed to have a different number of poles and a different number of modules. Here too, it is basically true that a stator having six, twelve or eighteen poles 33 is assembled preferably from only two identical modules 34, 35, whereas a stator having three, nine or fifteen poles 33 is in each case assembled from three modules 34, 35, 36, two or three modules being identical. Here too, higher numbers of poles are possible.

Figure 6:
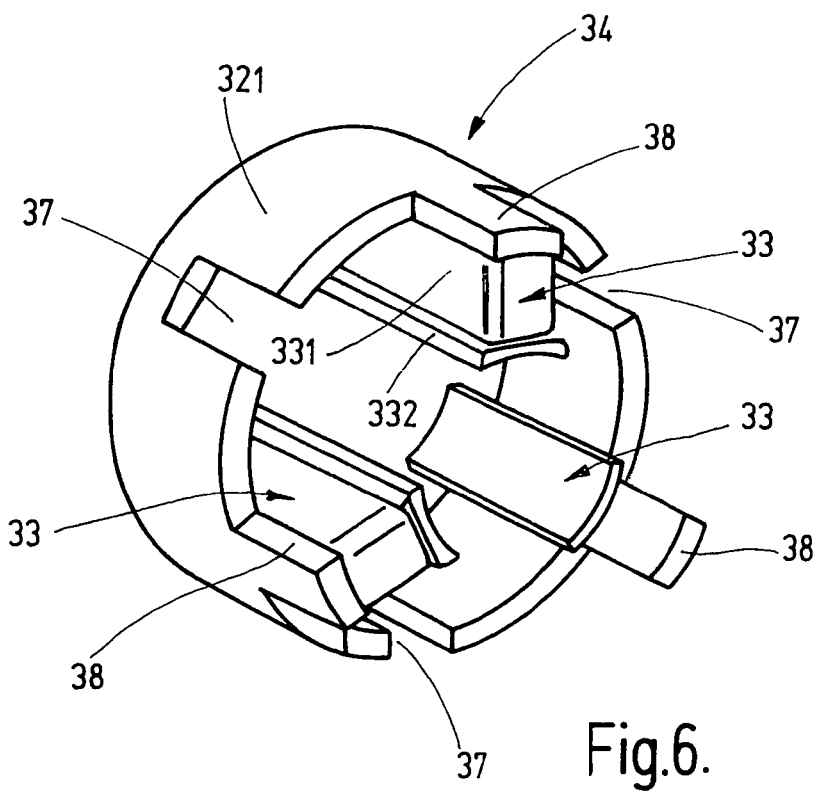
FIG. 6 shows a representation in perspective of a module of a stator for an internal-rotor motor according to a second exemplary embodiment.

FIG. 6 shows a module 34 of a stator 31, which is modified, compared to module 34 in FIG. 5, in so far as yoke part 321 has axially extending cutouts 37 and axially extending projections 38. Corresponding to the number of poles 33, there are three cutouts 37 and three projections 38, the projections 38 completely covering the axial protruding regions of pole cores 331 beyond yoke part 321, and ending approximately flush with them. Cutouts 37 on the one hand, and projections 38 on the other hand, are correspondingly offset to one another by a circumferential angle of 120°. Cutouts 37 are shaped in such a way that projections 38 may be inserted into them in a form locking manner. Two identical modules 34 are axially fit together to form stator 31 by having axes rotated with respect to each other by 180°, projections 38 of the one module 34 are inserted into cutouts 37 of the other module in a form locking manner. By this alternative separation of magnetic yoke 32 into the two identical yoke parts 321, and by thereby obtained projections 38 on yoke part 321, which in the circumferential direction protrude a little beyond pole cores 331, it is avoided that, after winding of module 34 with the pole windings, during modules 34 being fit together, the pole windings slip off partially from pole cores 331 and disturb the fitting procedure, as may occur in modules 34 that were shown and described in FIG. 5.

Figure 7:
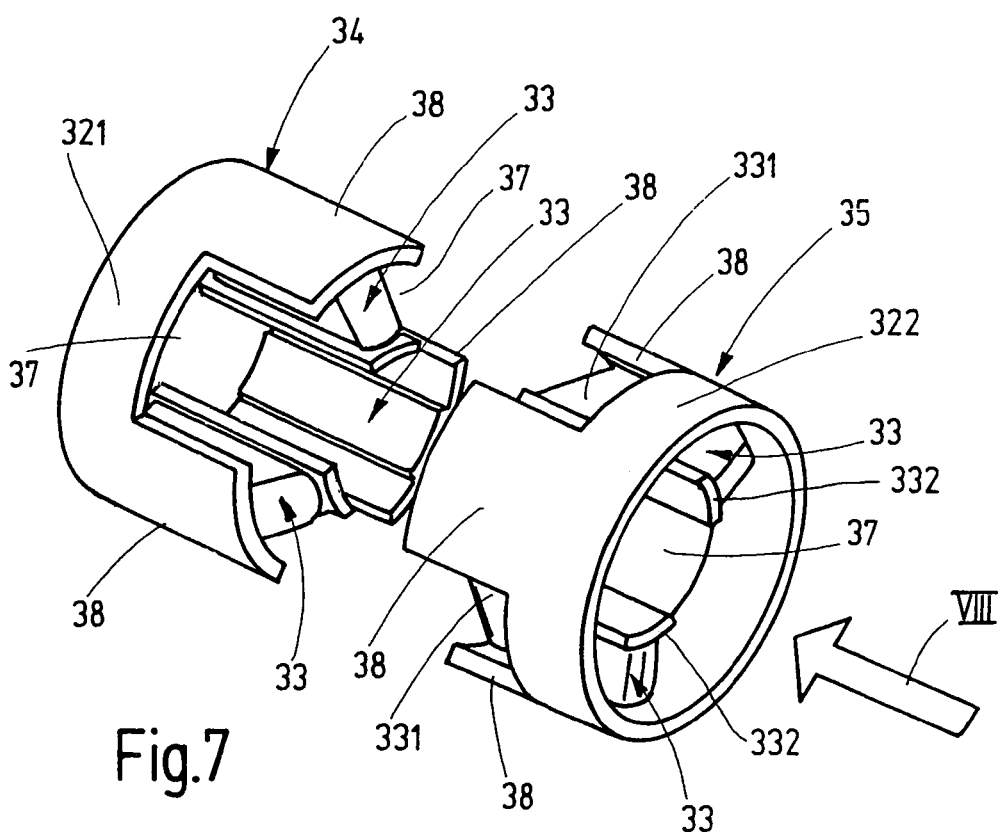
FIG. 7 shows an exploded representation of a stator for an internal-rotor motor according to a third exemplary embodiment.
Figure 8:
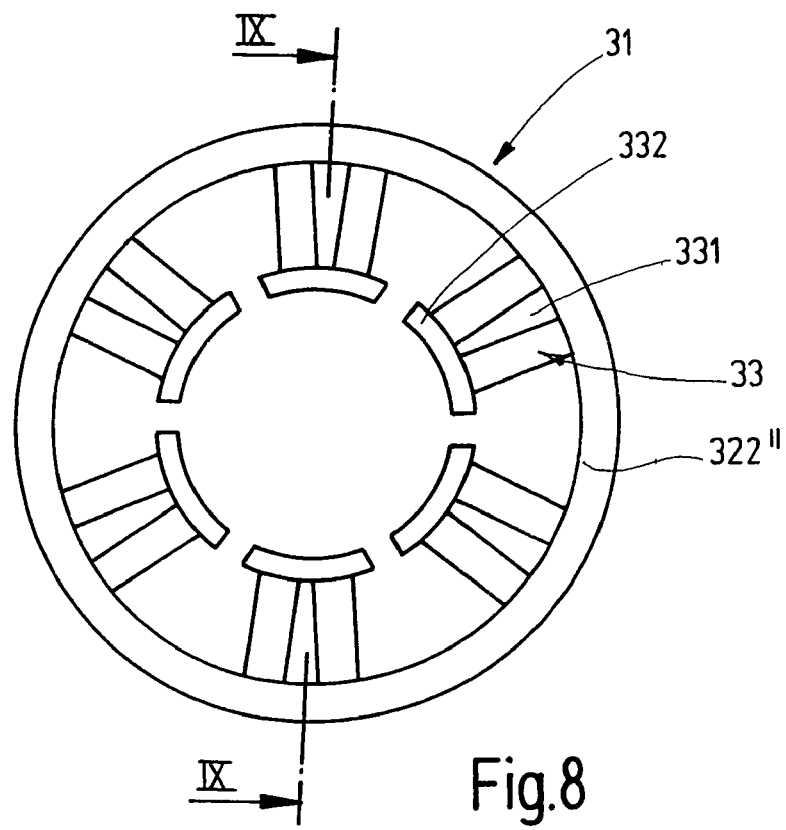
FIG. 8 shows a view of the stator in the direction of arrow VIII in FIG. 7.
Figure 9:
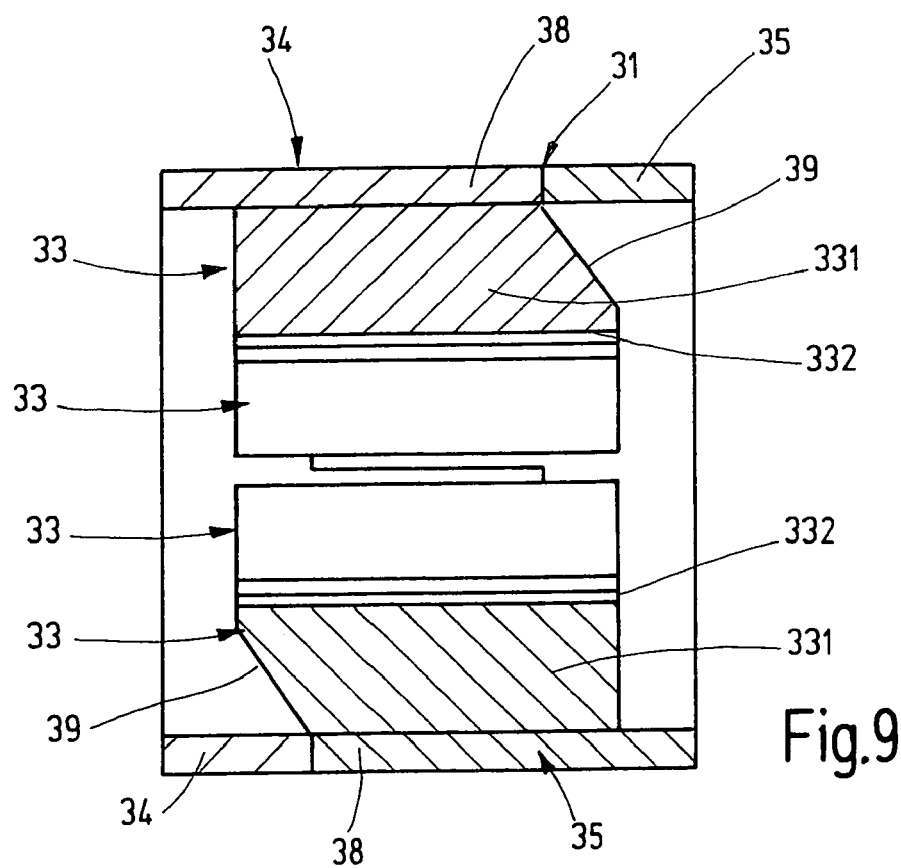
FIG. 9 shows a section along line IX-IX in FIG. 8.

In the stator shown in FIG. 7 in exploded representation, in FIG. 8 in a top view and in FIG. 9 in section, for a three-phase internal-rotor motor, the two modules 34 and 35 are basically developed as in FIG. 6. The two yoke parts 321 and 322 again have cutouts 37 and projections 38, the axial depth of cutouts 37, however, being dimensioned smaller than in module 34 in FIG. 6. Projections 38, which are inserted in a form locking manner into cutouts 37 when modules 34, 35 are assembled, are correspondingly shorter. In order to counter the above mentioned problem of the sliding off of the pole windings from pole cores 331, the radial core height of pole cores 331 in its end sections that still extend beyond projections 38 is steadily tapered, the slanting surface 39 created thereby extending from the core end at the yoke part end to the core end at the pole shoe end. The tapering of the end sections of pole cores 331 extending beyond projections 38, and the slanting surfaces 39 created thereby are particularly easy to see in the sectional representation in FIG. 9. The advantage of this constructive embodiment is that yoke parts 321, 322 have a greater axial crosspiece width at the foot of cutout 37, and therefore modules 34, 35 are more favorably designed for manufacture by pressing.

Figure 10:
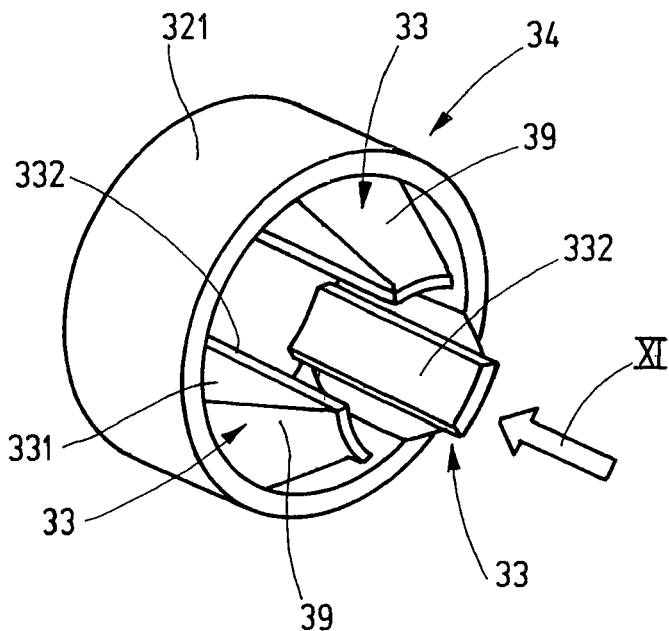
FIG. 10 shows a representation in perspective of a module of a stator for an internal-rotor motor according to a fourth exemplary embodiment.

In module 34 shown in FIG. 10, an axial offset separation of the yoke parts is omitted, and the identically formed modules 34 are assembled in a planar manner, using their parallel ring-shaped end faces. The axial width of yoke part 321 is the same in each module 34. In order to counter the problem mentioned, of the sliding off of the pole winding in the protruding region of poles 33 beyond yoke part 321, pole cores 331 in this protruding region are again steadily reduced in their radial core height. Since this protruding region forms half the axial length of poles 33, slanting surface 39 thus created is substantially flatter than in the embodiment of module 34 or 35 in FIG. 7-9.

Figure 11:
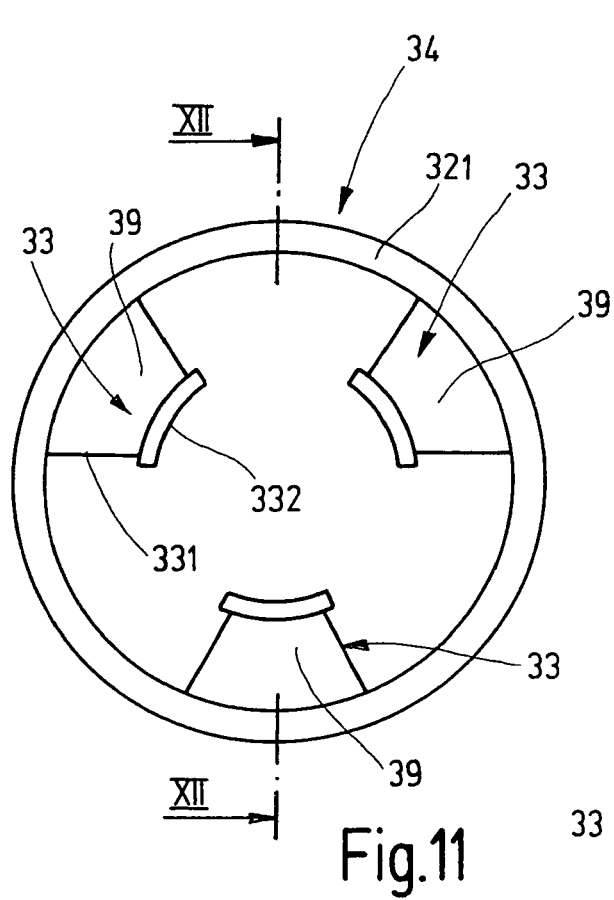
FIG. 11 shows a view of the module in the direction of arrow XI in FIG. 10.
Figure 12:
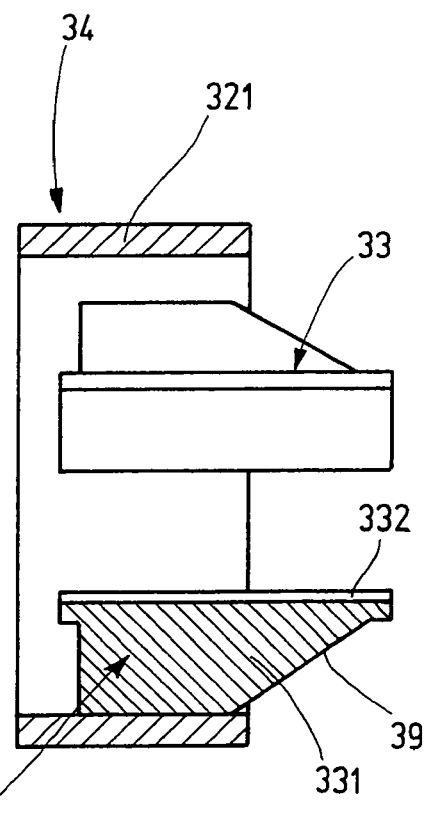
FIG. 12 shows a section along line XII-XII in FIG. 11.

If stator 31 shown in FIG. 17 is assembled from the three modules 34-36, which are developed as shown in FIG. 17, and, in these modules, the regions of poles 33 protruding beyond yoke parts 321-323 are developed to have tapering radial core height, as shown in FIG. 10-12, then, deviating from outer modules 34, 35, in middle module 36, poles 33 in both protruding regions protruding symmetrically beyond yoke part 323 are provided with the described slanting surfaces 39 created by the tapering of the pole cores.

Figure 13:
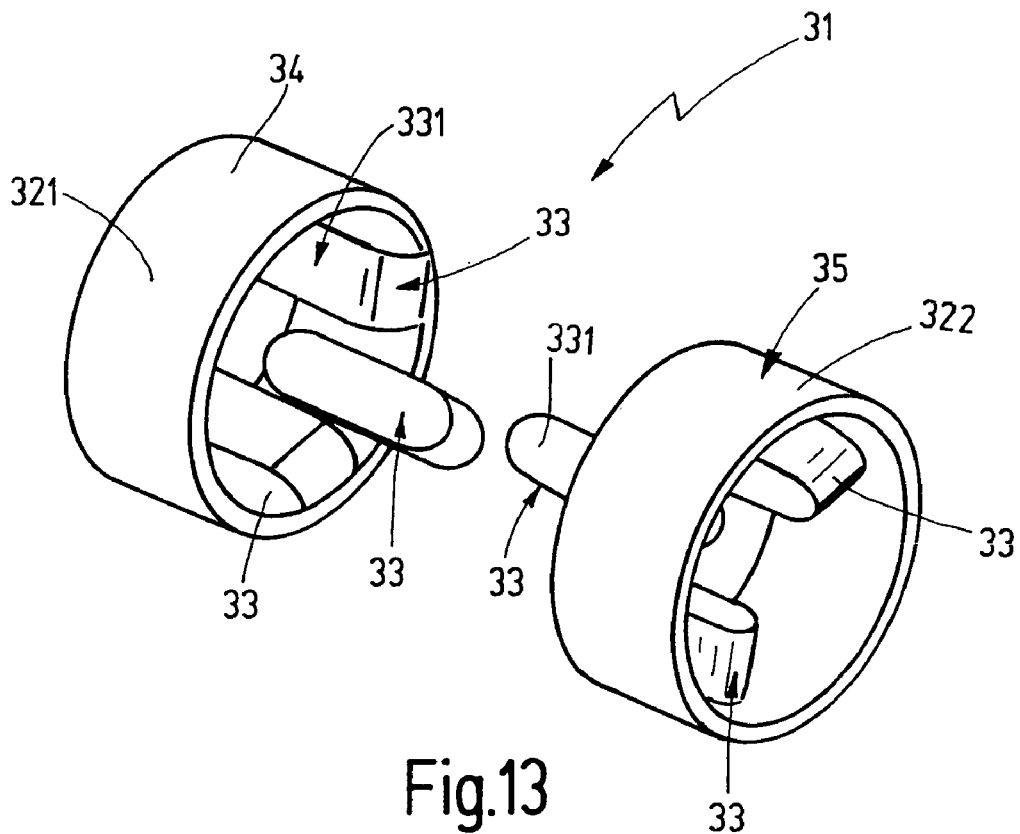
FIG. 13 shows an exploded representation of a stator for an internal-rotor motor according to a fifth exemplary embodiment.

FIG. 13 shows a stator 31 which, compared to the stator described in conjunction with FIG. 4, is modified only to the extent that poles 33 are designed without pole shoes 332. For winding this stator 31, the pole windings are developed as prefabricated ring coils, like the one shown in FIGS. 15 and 16. The ring coils are pushed onto pole cores 331 and secured from sliding off using suitable mechanical means. As for the rest, we refer to the description of stator 31 as in FIG. 4, the same components being marked in FIG. 13 by the same reference symbols as in FIG. 4.

Figure 14:
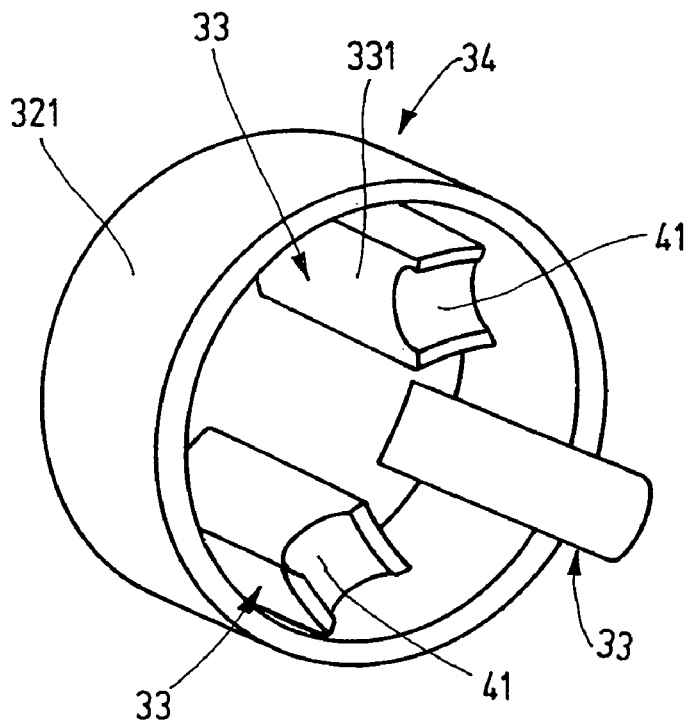
FIG. 14 shows a representation in perspective of a module of a stator for an internal-rotor motor according to a sixth exemplary embodiment.
Figure 15:
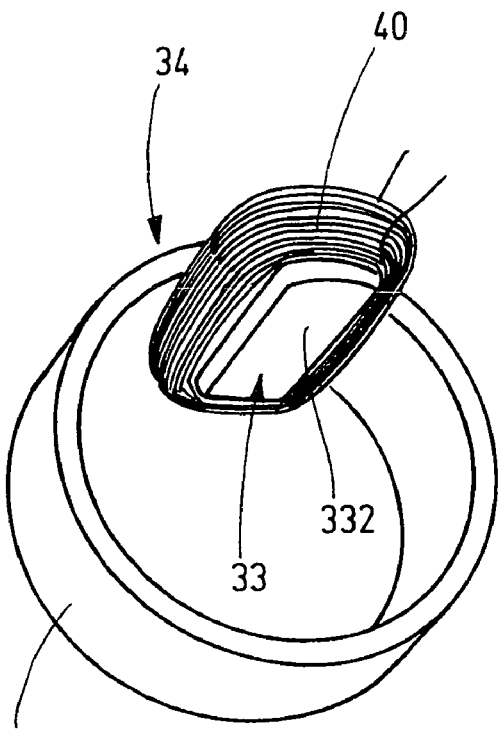
FIG. 15 shows a representation in perspective of the module in FIG. 14 having only one pole shoe and having a mounted pole winding.
Figure 16:
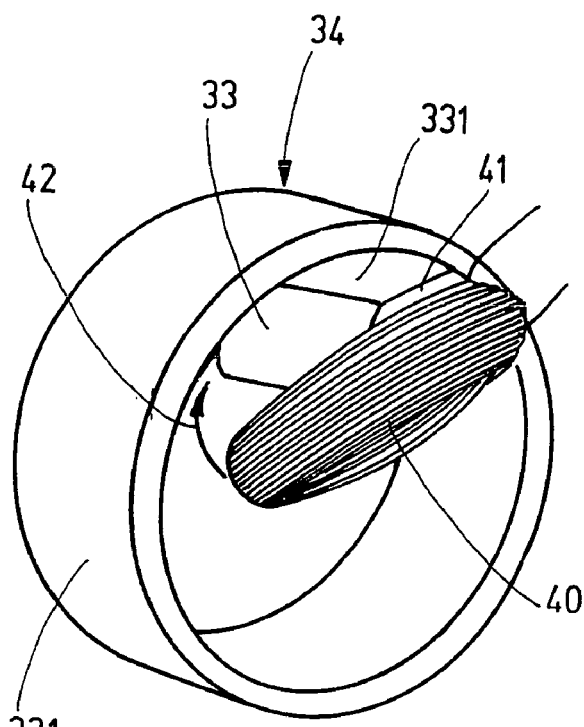
FIG. 16 shows the same representation as in FIG. 15, to demonstrate the mounting of the pole winding.

In module 34 shown in FIG. 14-16 for such a stator 31, an example is shown for the means for the mechanical localization of pole winding 40 on pole shoe-less poles 33. Each pole core 331 of poles 33 has at its one axial end, which axially protrudes beyond yoke part 321, a concave arching 41, in which pole winding 40 is held. FIGS. 15 and 16 show in the light of a pole winding 40 how it is mounted. Pole winding 40, that was prefabricated as a ring coil, is set into the arching 41, and is then swiveled in arrow direction 42 in FIG. 16 over pole core 331, an axial clamping force being created which fixes pole winding 40, using force locking, on the other axial end of pole core 331 that is not provided with an arching 41. A certain clamping effect may also be achieved at the long sides of pole cores 331. As for the rest, module 34 shown in FIG. 14 is equivalent to module 34 shown in FIG. 13.

What is claimed is:

1. An electrical machine comprising:
   a stationary main element including a stator; and
   a rotating main element including a rotor;
   wherein:
   one of the stationary main element and the rotating main element includes a magnetic yoke and a plurality of poles of a predefined number of poles;
   the plurality of poles project radially from the magnetic yoke and are made of SMC (soft magnetic powder iron composite) material;
   each of the plurality of poles carry a pole winding;
   the one of the stationary main element and the rotating main element is assembled from at least two modules that are axially adjacent, rigidly connected to one another, and respectively produced from the SMC material;
   each of the at least two modules includes a yoke part closed in on itself of the magnetic yoke and having an equal number of divisions of the plurality of poles attached thereto;
   the equal number corresponds to a certain fraction of a number of the plurality of poles determined by a number of the at least two modules;
   each pole includes a pole core and a pole shoe in one piece therewith;
   each one piece is situated at its end at a distance from the yoke part;
   the pole cores have an axial core width that is greater than an axial width of the yoke part;
   the yoke part includes notches on an end face thereof facing another other one of the at least two modules for a form locking partial accommodation of the pole cores of an adjoining module; and
   the pole shoes are aligned with the pole cores in such a way that their bordering edges, extending in a circumferential direction, are aligned when the at least two modules lie against each other.

2. The machine as recited in claim 1, wherein the plurality of poles are situated on each yoke part offset by equal circumferential angles to one another.

3. The machine as recited in claim 1, wherein the at least two modules have an equal axial yoke part width.

4. The machine as recited in claim 1, wherein at least two of the at least two modules are developed identically.

5. The machine as recited in claim 1, wherein, with respect to each pole, the pole shoe protrudes past the pole core.

6. An electrical machine, comprising:
   a stationary main element including a stator; and
   a rotating main element including a rotor;
   wherein:
      one of the stationary main element and the rotating main element includes a magnetic yoke and a plurality of poles of a predefined number of poles;
      the plurality of poles project radially from the magnetic yoke and are made of SMC (soft magnetic powder iron composite) material;
      each of the plurality of poles carry a pole winding;
      the one of the stationary main element and the rotating main element is assembled from at least two modules that are axially adjacent, rigidly connected to one another, and respectively produced from the SMC material;
      each of the at least two modules includes a yoke part closed in on itself of the magnetic yoke and having an equal number of divisions of the plurality of poles attached thereto;
      the equal number corresponds to a certain fraction of a number of the plurality of poles determined by a number of the at least two modules;
      the yoke part of each of two adjacently placed modules includes axially extending coutouts and axially extending projections, whose number corresponds in each case to the number of poles of the modules, and
      when the modules are set adjacent to each other, the projections of the one yoke part engage with the cutouts of the other yoke part, respectively, with form locking.

7. The machine as recited in claims 6, wherein each pole includes a pole core and a pole shoe in one piece therewith, and each one piece is situated at its end at a distance from the yoke part.

8. The machine as recited in claim 6, wherein:
   in each module the poles protrude beyond at least one end face of the yoke part axially so far that, when the modules lie against one another, the poles extend over an axial width of the magnetic yoke, and have their ends set back somewhat axially, compared to outer edges of the magnetic yoke.

9. The machine as recited in claim 8, wherein:
   each pole includes a pole core and a pole shoe in one piece, with the pole core situated at its end distant from the yoke part, and protruding past the pole core.

10. The machine as recited in claim 9, wherein a radial core height of core sections of the pole core axially projecting beyond the yoke part steadily tapers in a direction of a free end.

11. The machine as recited in claim 8, wherein the poles have pole cores that have, in their end face inserted into a bordering module, in each case a concave arching that extends over a radial core height.

12. The machine as recited in claim 6, wherein:
   at each module the projections completely cover core sections of the pole cores that axially protrude beyond the yoke part, and
   at each module the projections terminate approximately flush with their free ends.

13. The machine as recited in claim 6, wherein:
   the projections cover only a part of core sections of the pole cores that axially protrude beyond the yoke part, and
   end regions of the pole cores extending beyond the projections steadily taper in their radial core height in a direction of a free end.

14. The machine as recited in claim 6, wherein the plurality of poles are situated on each yoke part offset by equal circumferential angles to one another.

15. The machine as recited in claim 6, wherein the at least two modules have an equal axial yoke part width.

16. The machine as recited in claim 6, wherein at least two of the at least two modules are developed identically.

* * * * *